US012683504B2

(12) United States Patent
Wang et al.

(10) Patent No.: US 12,683,504 B2
(45) Date of Patent: Jul. 14, 2026

(54) MULTI-PHASE CIRCUIT CONTROL METHOD AND POWER CONVERSION DEVICE

(71) Applicant: DELTA ELECTRONICS, INC., Taoyuan City (TW)

(72) Inventors: Ching Wang, Taoyuan City (TW); Ting-Chen Pan, Taoyuan City (TW); Sheng-Hsiung Chuang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 167 days.

(21) Appl. No.: 18/823,860

(22) Filed: Sep. 4, 2024

(65) Prior Publication Data

US 2025/0219544 A1 Jul. 3, 2025

Related U.S. Application Data

(60) Provisional application No. 63/614,941, filed on Dec. 27, 2023.

(30) Foreign Application Priority Data

Mar. 12, 2024 (CN) .......................... 202410279993.4

(51) Int. Cl.
*H02M 3/158* (2006.01)
*H02M 1/08* (2006.01)
*H02M 3/00* (2006.01)

(52) U.S. Cl.
CPC ........... *H02M 3/1588* (2013.01); *H02M 1/08* (2013.01); *H02M 3/01* (2021.05)

(58) Field of Classification Search
CPC ......... H02M 3/1588; H02M 1/08; H02M 3/01
See application file for complete search history.

(56) References Cited

U.S. PATENT DOCUMENTS 9,148,064 B2 * 9/2015 Liu ................... H02M 3/33561
9,263,960 B2 2/2016 Jovanovic et al.
(Continued)

FOREIGN PATENT DOCUMENTS

CN 114567179 A 5/2022
CN 117060735 A 11/2023
(Continued)

OTHER PUBLICATIONS

Liao Yuefeng et al., "An LLC-DAB Hybrid Bidirectional Converter with Constant Frequency Synthetic Modulation Strategy for Wide Input Range", 2023 IEEE 2nd International Power Electronics and Application Sympositum (PEAS), IEEE, Nov. 10, 2023, pp. 304-309, XP034526378, DOI: 10.1109/PEAS58692.2023.10395699.
(Continued)

*Primary Examiner* — Rafael O Leon De Domenech
(74) *Attorney, Agent, or Firm* — CKC & Partners Co., LLC

(57) ABSTRACT

A multi-phase circuit control method includes following steps: generating a first control signal and a second control signal to a first phase circuit respectively by a controller; generating a third control signal and a fourth control signal to a second phase circuit respectively by controller; outputting a two-phase voltage to a output terminal of a power conversion device by first phase circuit and second phase circuit; changing a duty cycle of third control signal to turn off a first switch of a primary side circuit and a rectifier side circuit of second phase circuit by controller when controller is configured to detect that output voltage is lower than a first preset voltage; changing a duty cycle of fourth control signal to conduct a second switch of a primary side circuit and a rectifier side circuit of second phase circuit; and outputting a single-phase voltage to output terminal.

15 Claims, 9 Drawing Sheets

(56)　　　　　References Cited

U.S. PATENT DOCUMENTS

| | | | | |
|---|---|---|---|---|
| 2014/0192560 A1* | 7/2014 | Ou | H02M 1/08 |
| | | | 363/16 |
| 2020/0266714 A1 | 8/2020 | Taylor et al. | |
| 2021/0135584 A1 | 5/2021 | Dutta et al. | |
| 2023/0238831 A1* | 7/2023 | Choi | H02J 50/12 |
| | | | 307/104 |

FOREIGN PATENT DOCUMENTS

| | | |
|---|---|---|
| EP | 4277102 A1 | 11/2023 |
| EP | 4391342 A1 | 6/2024 |
| TW | 202147758 A | 12/2021 |
| TW | 202203561 A | 1/2022 |
| TW | M634785 U | 12/2022 |
| WO | 2023157916 A1 | 8/2023 |

OTHER PUBLICATIONS

Chou Zhi-Xuan et al., "Light-load Conversion Efficiency Enhancement for Three-Phase Dual Active Bridge DC-DC Converters ", 2023 IEEE International Future Energy Electronics Conference (IFEEC), IEEE, Nov. 20, 2023, pp. 78-82, XP034567626, DOI: 10.1109/IFEEC58486.2023.10458469.

Arshadi Sayed Abbas et al., "Three-Phase LLC Battery Charger: Wide Regulation and Improved Light-Load Operation", IEEE Transactions on Power Electronics, Institue of Electrical and Electronics Engineers, USA, vol. 36, No. 2, Jul. 1, 2020, pp. 1519-1531, XP011811912, ISSN:0885-8993, DOI:10.1109/TPEL.2020.3006422.

Jovanovic Milan M et al.,"Efficiency optimization of LLC resonant converters operating in wide input- and/or output-voltage range by on-the-fly topology-morphing control", 2015 IEEE Applied Power Electronics Conference and Exposition (APEC), IEEE, Mar. 15, 2015, pp. 1420-1427, XP032775165, DOI: 10.1109/APEC.2015.7104534.

Cunico Lucas Mondardo et al., "Single-Phase Operating Modes for DC-DC Three-Phase Dual-Active-Bridge With Y[Delta] Transformer", IEEE Journal of Emerging and Selected Topics in Power Electronics, IEEE, Piscataway, NJ, USA, vol. 10, No. 4, Jan. 11, 2022, pp. 4845-4853, XP011916758, ISSN: 2168-6777, DOI: 10.1109/JESTPE.2022.3142686.

* cited by examiner

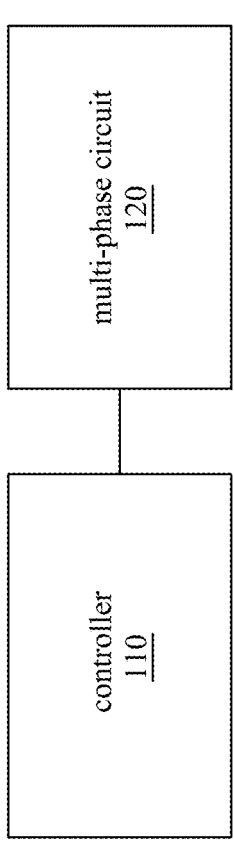
Fig. 1

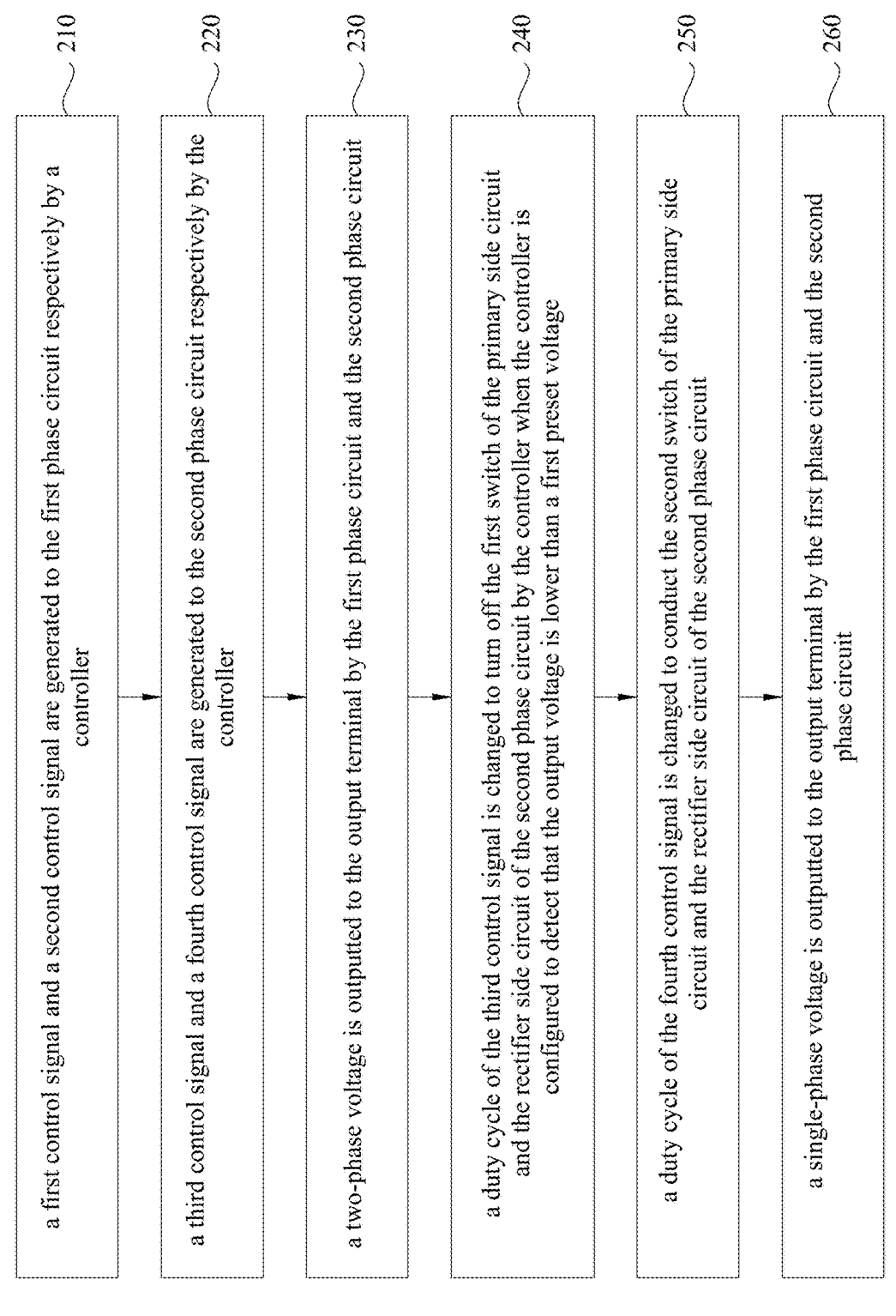

200 a first control signal and a second control signal are generated to the first phase circuit respectively by a controller ⌇ 210 a third control signal and a fourth control signal are generated to the second phase circuit respectively by the controller ⌇ 220 a two-phase voltage is outputted to the output terminal by the first phase circuit and the second phase circuit ⌇ 230 a duty cycle of the third control signal is changed to turn off the first switch of the primary side circuit and the rectifier side circuit of the second phase circuit by the controller when the controller is configured to detect that the output voltage is lower than a first preset voltage ⌇ 240 a duty cycle of the fourth control signal is changed to conduct the second switch of the primary side circuit and the rectifier side circuit of the second phase circuit ⌇ 250 a single-phase voltage is outputted to the output terminal by the first phase circuit and the second phase circuit ⌇ 260

Fig. 3

MULTI-PHASE CIRCUIT CONTROL METHOD AND POWER CONVERSION DEVICE

CROSS-REFERENCE TO RELATED APPLICATION

This application claims priority to U.S. Provisional Application Ser. No. 63/614,941 filed Dec. 27, 2023, and China Application Serial Number 202410279993.4, filed Mar. 12, 2024, the disclosures of which are incorporated herein by reference in their entireties.

BACKGROUND

Field of Invention

The present disclosure relates to an electronic system and a control method. More particularly, the present disclosure relates to a multi-phase circuit control method and a power conversion device.

Description of Related Art

A voltage demand range of conventional electric vehicles is between 400 volts (V) and 800 volts (V), and a current demand range is between 1 amp (A) and 40 amp (A). Based on a situation that an output voltage requires multiple voltage ranges and multiple current ranges, a power conversion device only uses a design of a single three-phase resonant circuit, so that a gain between an input voltage and an output voltage cannot reach an original expected gain, or an input voltage and an output voltage cannot reach an expected operating range.

If a three-phase resonant circuit is directly switched to a two-phase output or a single-phase output, due to different gain requirements of different phases, an output voltage and an output current will overshoot and undershoot.

For the foregoing reasons, there is a need for providing a multi-phase circuit control method and a power conversion device to solve the above problems encountered in related art approaches.

SUMMARY

One aspect of the present disclosure provides a multi-phase circuit control method. The multi-phase circuit control method is adapted for a multi-phase circuit. The multi-phase circuit is coupled to an input terminal and an output terminal of a power conversion device, and is configured to convert an input voltage of the input terminal into an output voltage required by the output terminal. The multi-phase circuit includes a first phase circuit and a second phase circuit. Each of the first phase circuit and the second phase circuit includes a primary side circuit and a rectifier side circuit. Each of the primary side circuit and the rectifier side circuit includes a first switch and a second switch. The multi-phase circuit control method includes: generating a first control signal and a second control signal to the first phase circuit respectively by a controller; generating a third control signal and a fourth control signal to the second phase circuit respectively by the controller; outputting a two-phase voltage to the output terminal by the first phase circuit and the second phase circuit; changing a duty cycle of the third control signal to turn off the first switch of the primary side circuit and the rectifier side circuit of the second phase circuit by the controller when the controller is configured to detect that the output voltage is lower than a first preset voltage; changing a duty cycle of the fourth control signal to conduct the second switch of the primary side circuit and the rectifier side circuit of the second phase circuit; and outputting a single-phase voltage to the output terminal by the first phase circuit and the second phase circuit.

Another aspect of the present disclosure provides a power conversion device. The power conversion device includes a controller and a multi-phase circuit. The controller is coupled to an input terminal and an output terminal of the power conversion device, and is configured to generate a first control signal, a second control signal, a third control signal and a fourth control signal. The multi-phase circuit is coupled to the input terminal and the output terminal of the power conversion device. The multi-phase circuit includes a first phase circuit and a second phase circuit. The multi-phase circuit is coupled to the input terminal and the output terminal of the power conversion device. The first phase circuit is coupled to the controller, and is configured to be conducted according to the first control signal and the second control signal. The second phase circuit is coupled to the coupled to the controller, and is configured to be conducted according to the third control signal and the fourth control signal. The first phase circuit and the second phase circuit are jointly configured to generate a two-phase voltage. When the controller is configured to detect that an output voltage of the output terminal is lower than a first preset voltage, the controller is configured to change a duty cycle of the third control signal and a duty cycle of the fourth control signal respectively so as to control the first phase circuit and the second phase circuit to output a single-phase voltage.

The present disclosure provides a control method that enables a multi-phase circuit of a power conversion device to meet different voltage ranges and current ranges, and to provide a three-phase voltage, two-phase voltage and a single-phase on the live line according to requirements of an output voltage to meet needs of different gains.

BRIEF DESCRIPTION OF THE DRAWINGS

The present disclosure can be more fully understood by reading the following detailed description of the embodiment, with reference made to the accompanying drawings as follows:

FIG. 1 depicts a schematic diagram of a power conversion device according to some embodiments of the present disclosure;

FIG. 3 depicts a flow chart of a multi-phase circuit control method according to some embodiments of the present disclosure;

DETAILED DESCRIPTION

Figure 2:
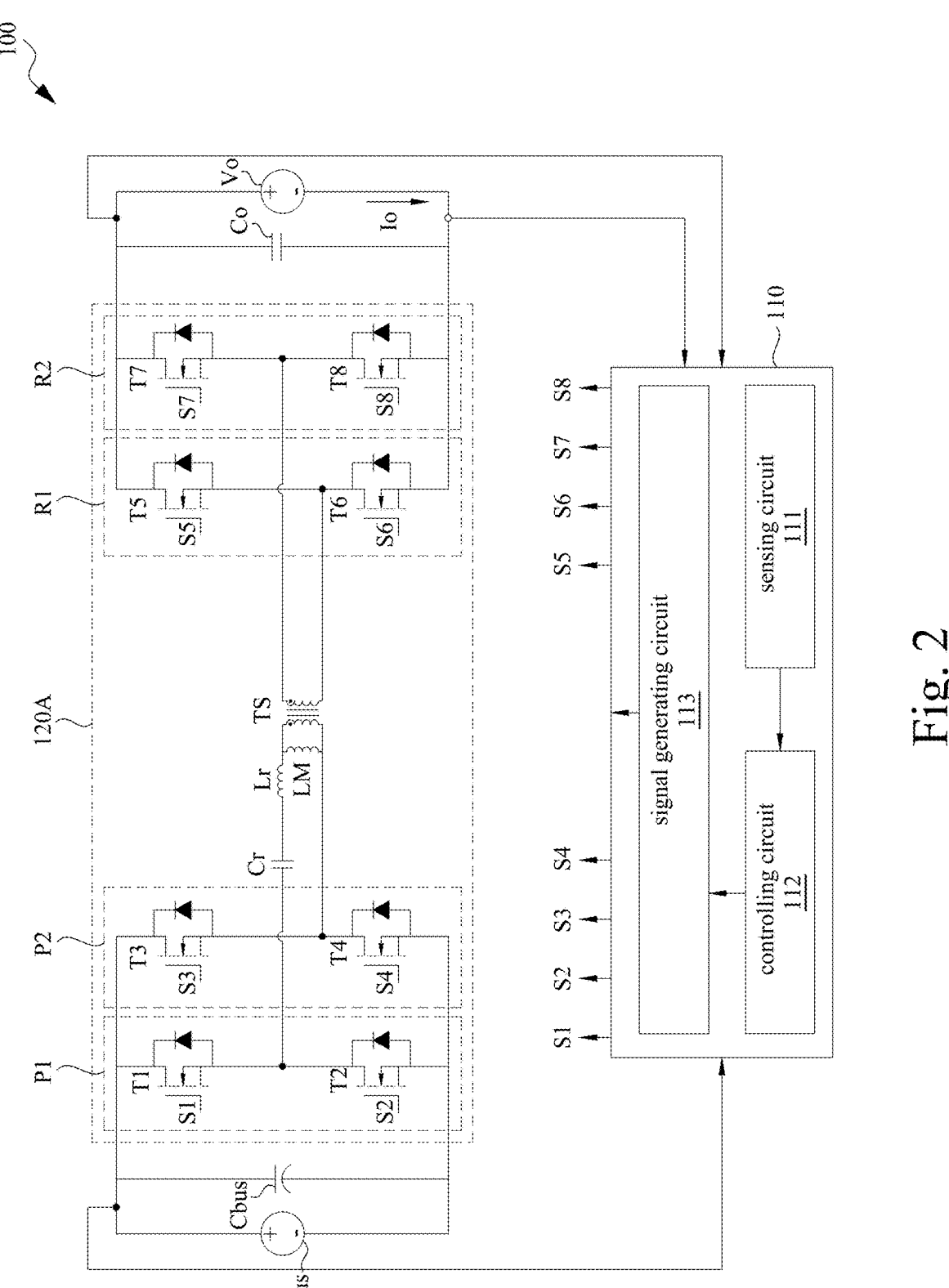
FIG. 2 depicts a schematic diagram of a controller and a multi-phase circuit of a power conversion device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a power conversion device 100 according to some embodiments of the present disclosure. The power conversion device 100 includes a controller 110 and a multi-phase circuit 120.

In some embodiments, the controller 110 can be implemented by pure hardware and does not rely on software to realize its functions. For example, the controller 110 can be configured to monitor an input voltage and an output voltage of the multi-phase circuit 120 to respectively generate control signals of a plurality of switches (not shown in the figure) of the multi-phase circuit 120. In some embodiments where the controller 110 is implemented by pure hardware, the controller 110 can be implemented by application specific integrated circuit (ASIC).

The controller 110 includes but not limited to a single processor and an integration of many micro-processors, for example, a central processing unit (CPU), a digital signal processor (DSP) or a graphic processing unit (GPU) and so on.

In some embodiments, under a control of the controller 110, the multi-phase circuit 120 can be configured as a voltage/power converter to convert an input voltage into an output voltage of different specifications for driving or supplying power to an electric load (such as an electric vehicle, a motor, a battery, a processor, etc., not shown in the figure). In some embodiments, the multi-phase circuit 120 can be implemented by a dual active bridge (DAB) circuit, a three-phase LLC resonant circuit or other similar multi-phase conversion circuit. The multi-phase circuit 120 is configured to provide an output power through multiple phases. By distributing the power to multiple-phase, it can provide high power output and high efficiency. The multi-phase circuit 120 can make a voltage range of an output voltage larger than that of a DC/DC conversion circuit, and reduce a loss of DC/DC conversion through its characteristics.

FIG. 2 depicts a schematic diagram of the controller 110 and a multi-phase circuit 120A of the power conversion device 100 in FIG. 1 according to some embodiments of the present disclosure. In some embodiments, the multi-phase circuit 120A is implemented as a DAB circuit (or two-phase circuit). The controller 110 and the multi-phase circuit 120A are coupled to an input terminal (i.e. a capacitor Cbus, or a bus terminal) and an output terminal (i.e. a capacitor Co, or between a live wire and an earth wire of a power gird) of the power conversion device 100.

In some embodiments, the controller 110 includes a sensing circuit 111, a controlling circuit 112 and a signal generating circuit 113. The sensing circuit 111 is configured to detect a bus voltage Vbus of the input terminal, an output voltage Vo and an output current Io of the output terminal, and is configured to generate a feedback signal to the controlling circuit 112. The controlling circuit 112 is configured to generate corresponding instructions according to a status of the feedback signal to control the signal generating circuit 113 to generate corresponding control signals S1-S8 to the multi-phase circuit 120A. The signal generating circuit 113 is configured to generate the control signals S1-S8 to control the multi-phase circuit 120A. In some embodiments, the control signals S1-S8 are pulse-width modulation (PWM) signals.

In some embodiments, the multi-phase circuit 120A includes a first phase circuit, a second phase circuit, a resonant capacitor Cr, a resonant inductor Lr, a magnetizing inductor LM and a transformer TS. The first phase circuit includes a primary side circuit P1 and a rectifier side circuit R1. The second phase circuit includes a primary side circuit P2 and a rectifier side circuit R2. The primary side circuit P1 and the primary side circuit P2 are full bridge circuits. The rectifier side circuit R1 and the rectifier side circuit R2 are full bridge circuits.

The multi-phase circuit 120A basically consists of four structures, including a primary side, a resonant side, a transformer side and a rectifier side. The primary side is the aforementioned primary side circuit P1 and the primary side circuit P2. A function of the primary side is to convert a DC voltage (i.e. the bus terminal voltage Vbus) into a high frequency square wave to the resonant side. The resonant side is a resonant tank composed of the aforementioned resonant capacitor Cr, the resonant inductor Lr and the magnetizing inductor LM. A function of the resonant side is to eliminate harmonics of the high-frequency square wave on the primary side and output a sine wave.

Then, the transformer side is the aforementioned transformer TS. A function of the transformer side is to output the sine wave to the rectifier side, and perform voltage boosting and bucking according to actual needs. The rectifier side is the rectifier side circuit R1 and the rectifier side circuit R2. A function of the rectifier side is to convert the sine wave into a stable DC voltage (i.e., an output voltage Vo). The aforementioned content is an operation and an output of different multi-phase voltages of the multi-phase circuit 120A.

In some embodiments, the primary side circuit P1 includes a switch T1 and a switch T2. The primary side circuit P2 include a switch T3 and a switch T4. The rectifier side circuit R1 includes a switch T5 and a switch T6. The rectifier side circuit R2 includes a switch T7 and a switch T8. Please start from a top side and a right side of each of components in the picture as a first terminal, each of the switch T1 to the switch T8 includes a first terminal, a second terminal and a control terminal. The control terminals of the switch T1 to the switch T8 are alternately conducted in response to levels of the control signal S1 to the control signal S8. The second terminal of the switch T1 and the first terminal of the switch T2 are coupled to a second terminal of the resonant capacitor Cr. The second terminal of the switch T3 and the first terminal of the switch T4 are coupled to a second terminal of the magnetizing inductor LM and a fourth terminal of the transformer TS. A first terminal of the magnetizing inductor LM is coupled to a first terminal of the resonant inductor Lr and a third terminal of the transformer TS. A second terminal of the resonant inductor Lr is coupled to a first terminal of the resonant capacitor Cr. The second terminal of the switch T5 and the first terminal of the switch T6 are coupled to a first terminal of the transformer TS. The second terminal of the switch T7 and the first terminal of the switch T8 are coupled to a second terminal of the transformer TS.

In some embodiments, the switch T1 to the switch T8 can be respectively implemented as P-type Metal-Oxide-Semiconductor Field-Effect Transistor (PMOS) or N-type Metal-Oxide-Semiconductor Field-Effect Transistor (NMOS) according to actual needs.

Figure 4:
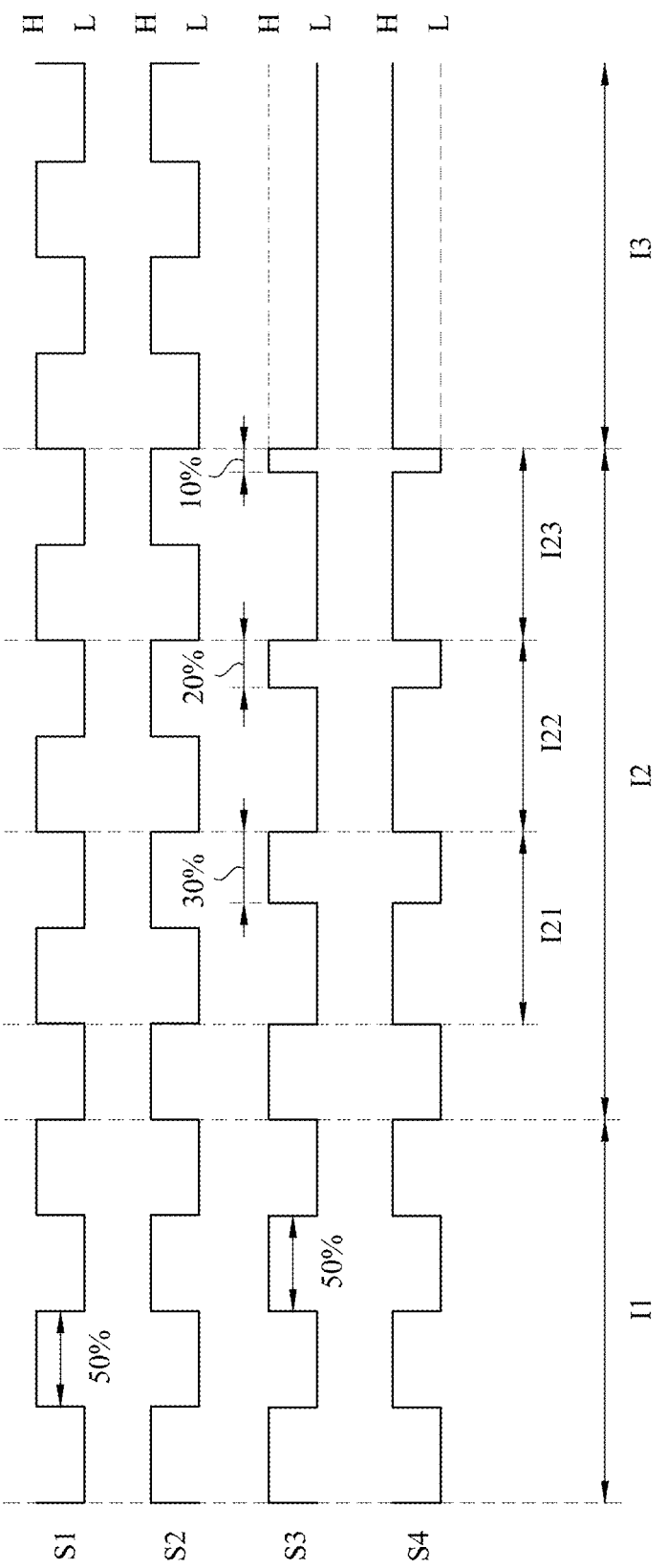
FIG. 4 depicts a timing diagram of control signals of a multi-phase circuit of a power conversion device according to some embodiments of the present disclosure.
Figure 5:
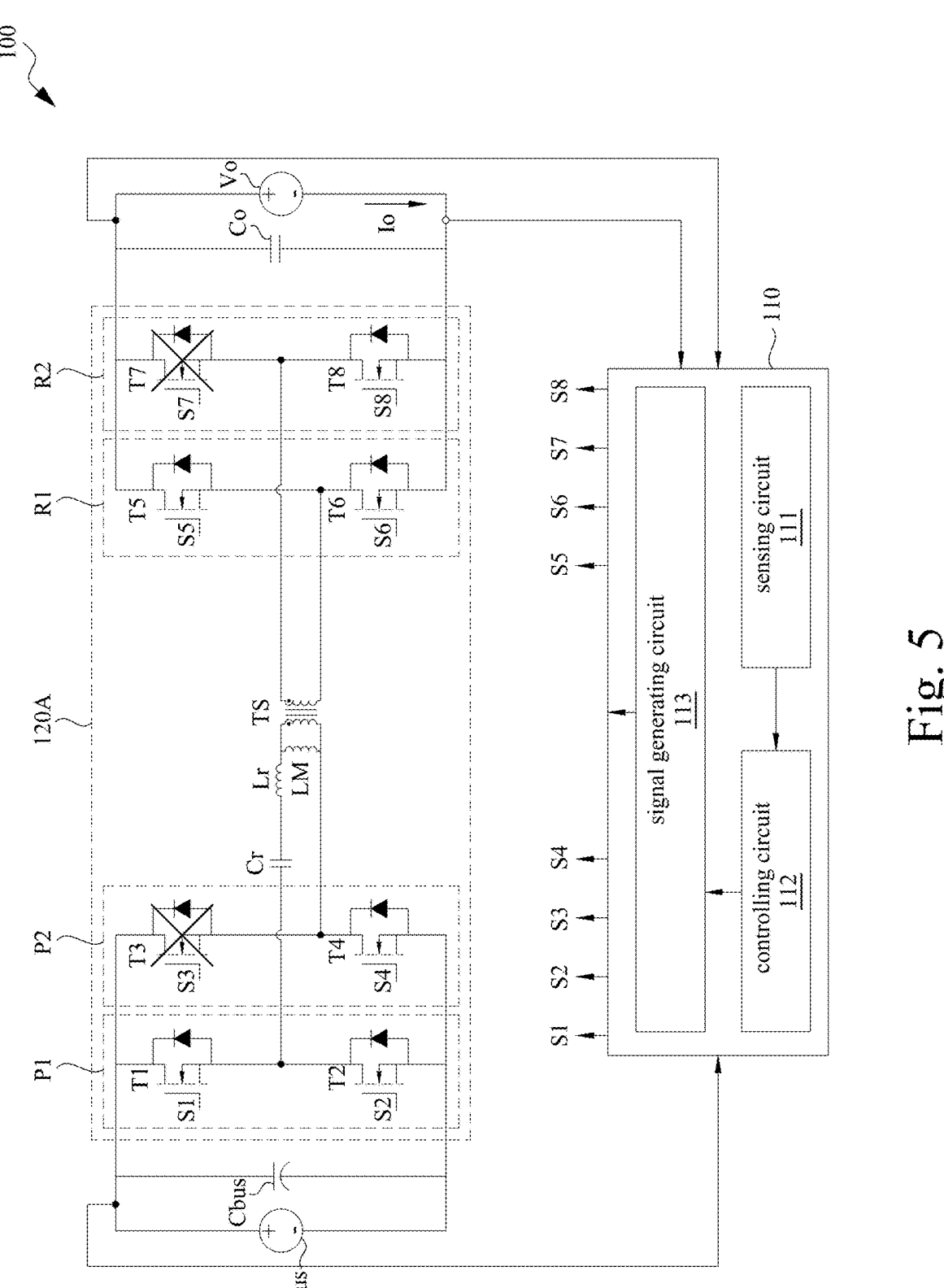
FIG. 5 depicts a schematic diagram of a circuit state of a multi-phase circuit of a power conversion device according to some embodiments of the present disclosure.

In order to facilitate the understanding an operation of the multi-phase circuit 120A of the present disclosure, please refer to FIG. 3 and FIG. 4. FIG. 3 depicts a flow chart of a multi-phase circuit control method 200 according to some embodiments of the present disclosure. FIG. 4 depicts a timing diagram of control signals of the multi-phase circuit 120A of the power conversion device 100 according to some embodiments of the present disclosure. FIG. 5 depicts a schematic diagram of a circuit state of the multi-phase circuit 120A of the power conversion device 100 according to some embodiments of the present disclosure. The multi-phase circuit control method 200 includes a step 210 to a step 260. The multi-phase circuit control method 200 can be executed by the power conversion device 100 in FIG. 2.

In step 210, please refer to FIG. 2 to FIG. 4, The signal generating circuit 113 of the controller 110 is configured to generate the control signal S1 and the control signal S2 respectively to the primary side circuit P1 of the first phase circuit, and generate the control signal S5 and the control signal S6 respectively to the rectifier side circuit R1 of the first phase circuit. The control signal S1 is basically the same as the control signal S5. The control signal S2 is basically the same as the control signal S6. The control signal S1 and the control signal S2 are opposite signals to each other. Following paragraphs will focus on the control signal S1 and the control signal S2. In other words, the following paragraphs will focus on an operation of the primary side. An operation of the rectifier side is synchronized with the operation of the primary side, and will not be described in detail in following paragraphs.

In step 220, please refer to FIG. 2 to FIG. 4, The signal generating circuit 113 of the controller 110 is configured to generate the control signal S3 and the control signal S4 respectively to the primary side circuit P2 of the second phase circuit, and generate the control signal control signal S7 and the control signal S8 respectively to the rectifier side circuit R2 of the second phase circuit. The control signal S3 is basically the same as the control signal S7. The control signal S4 is basically the same as the control signal S8. The control signal S3 and the control signal S4 are opposite signals to each other. Following paragraphs will focus on the control signal S3 and the control signal S4. In other words, the following paragraphs will focus on an operation of the primary side, An operation of the rectifier side is synchronized with the operation of the primary side, and will not be described in detail in following paragraphs.

In step 230, please refer to FIG. 2 to FIG. 4, the switch T1 and the switch T2 of the primary side circuit P1 of the first phase circuit are conducted in turns according to the control signal S1 and the control signal S2 in a stage I1 respectively. At the same time, the switch T3 and the switch T4 of the primary side circuit P2 of the second phase circuit are conducted in turns according to the control signal S3 and the control signal S4. The DC voltage (i.e. the bus terminal voltage Vbus) is converted into a high-frequency square wave through the primary side circuit P1 and the primary side circuit P2. Then, a stable two-phase voltage is outputted to the output terminal (i.e. the capacitor Co) through the conversion of the resonant side, the transformer side and the rectifier side respectively. Detailed operations have been described in the above paragraphs and detail repetitious descriptions are omitted here. In some embodiments, a voltage range of the two-phase voltage is between 250V and 400V.

A voltage demand range of conventional electric vehicles is between 400 volts (V) and 800 volts (V), and a current demand range is between 1 amp (A) and 40 amp (A). Based on a situation that an output voltage requires multiple voltage ranges and multiple current ranges, for example, voltage and current requirements of an original three-phase voltage were 800V and 30 amps (A) respectively. Now voltage and current requirements of a single-phase voltage are 150V and 10 amp (A) respectively. A power conversion device only uses a design of a single three-phase resonant circuit, so that a gain between an input voltage and an output voltage cannot reach an original expected gain, or an input voltage and an output voltage cannot reach an expected operating range.

In addition, if a three-phase resonant circuit is directly switched to a two-phase output or a single-phase output, due to different gain requirements of different phases, an output voltage and an output current will overshoot and undershoot. A definition of overshoot is that a signal exceeds an expected value, which is one of transient responses. On the contrary, when an signal is lower than an expected value, it is called undershoot.

In step 240, please refer to FIG. 3 to FIG. 5, when the controller 110 is configured to detect that the output voltage Vo is lower than the preset voltage (for example, 250V, the value in only configured as an example and is not limited to this embodiment) in the stage I1, a soft conversion mechanism is activated by the controller 110 to switch the output voltage from a stable two-phase voltage to a stable single-phase voltage. The controller 110 is configured to change a duty cycle of the control signal S3 to turn off the switch T3 of the primary side circuit P2 and the switch T7 of the rectifier side circuit R2 of the second phase circuit.

In some embodiments, please refer to FIG. 4 and FIG. 5, the controller 110 is configured to gradually reduce the duty cycle of the control signal S3 in the stage I1 from 50% to 30%, 20% and 10% in sequence in three sub-stages 121 to 123 of a stage I2. Finally, in a stage I3, the duty cycle of the control signal S3 is adjusted to zero by the controller 110.

In step 250, please refer to FIG. 3 to FIG. 5, following the aforementioned description of step 240, when the controller 110 is configured to detect that the output voltage Vo is lower than the preset voltage (for example, 250V, the value in only configured as an example and is not limited to this embodiment) in the stage I1, the controller 110 is configured to change a duty cycle of the control signal S4 to completely conduct the switch T4 of the primary side circuit P2 and the switch T8 of the rectifier side circuit R2 of the second phase circuit.

In some embodiments, please refer to FIG. 4 and FIG. 5, the controller 110 is configured to gradually increase the duty cycle of the control signal S4 in the stage I1 from 50% to 70%, 80% and 90% (relative to the control signal S3) in sequence in three sub-stages 121 to 123 of the stage I2. Finally, in the stage I3, the duty cycle of the control signal S3 is adjusted to 100% by the controller 110.

In step 260, please refer to FIG. 2 to FIG. 4, the switch T1 and the switch T2 of the primary side circuit P1 of the first phase circuit are maintained to be alternately conducted. At the same time, the switch T3 of the primary side circuit P2 of the second phase circuit is turned off according to the control signal S3, and the switch T4 is conducted according to the control signal S4. A stable single-phase voltage is outputted to the output terminal (i.e. the capacitor Co) through the first phase circuit and the second phase circuit. Detail operation is similar to step 230, and detail repetitious descriptions are omitted here.

In some embodiments, if the output voltage Vo is higher than the preset voltage (for example, 250V, the value in only configured as an example and is not limited to this embodiment), the controller 110 is configured to change the duty cycle of the control signal S3 and the duty cycle of the control signal S4 respectively (equivalent to a reverse change from the stage I3 to the stage I1) to switch from outputting a stable single-phase voltage to outputting a stable two-phase voltage through the first phase circuit and the second phase circuit. A phase difference between each phase is 180°.

Through the aforementioned soft conversion mechanism of the multi-phase circuit control method 200, the multi-phase circuit 120A can respectively output a two-phase voltage and a single-phase voltage that meet an expected gain, and avoid overshoot and undershoot of the output voltage Vo and the output current Io.

Figure 6:
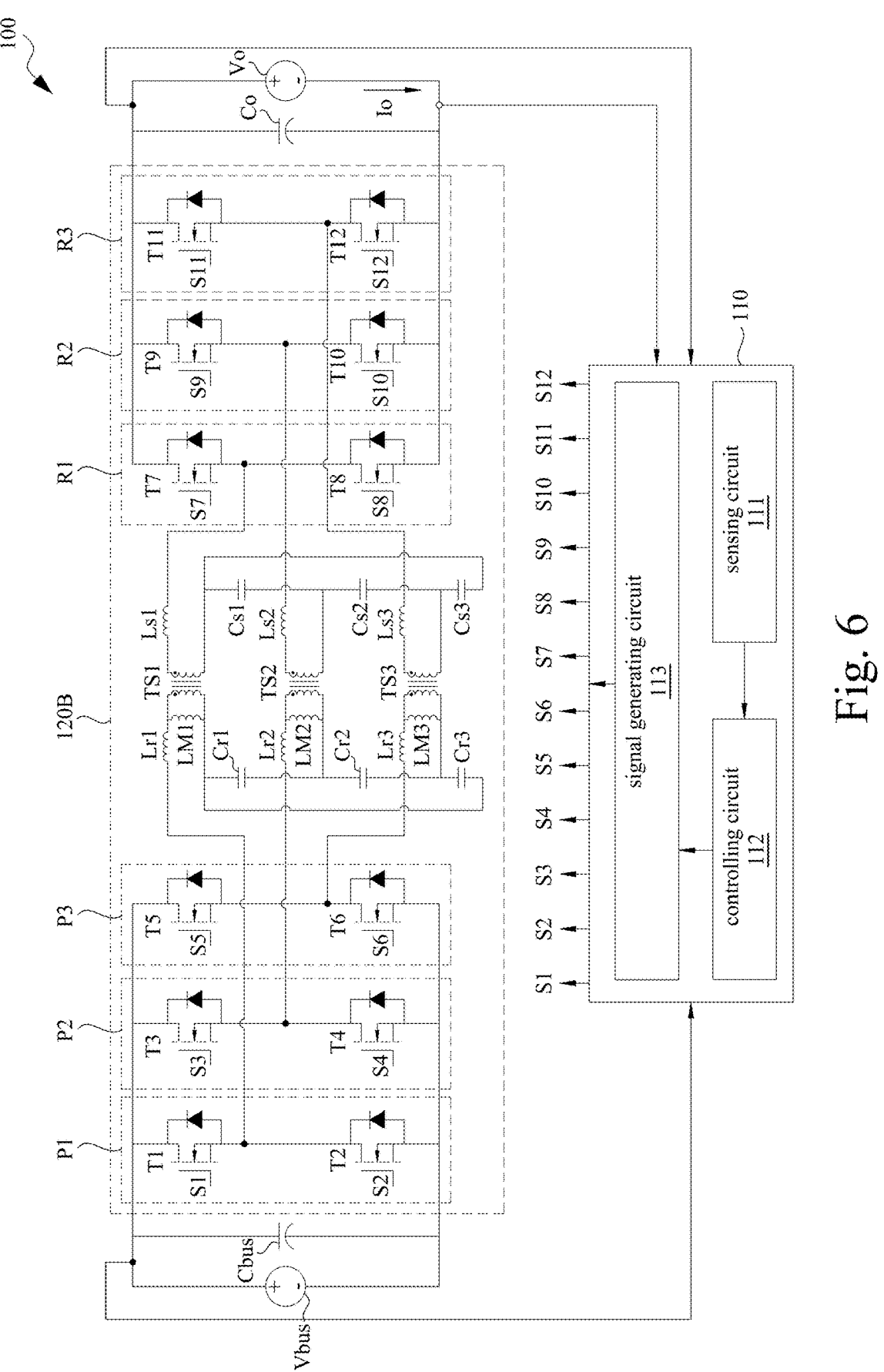
FIG. 6 depicts a schematic diagram of a controller and a multi-phase circuit of a power conversion device according to some embodiments of the present disclosure.

FIG. 6 depicts a schematic diagram of the controller 110 and a multi-phase circuit 120B of the power conversion device 100 according to some embodiments of the present disclosure. In some embodiments, the multi-phase circuit 120B is implemented as a three-phase circuit. The controller 110 and the multi-phase circuit 120B are coupled to the input terminal (i.e. the capacitor Cbus, or a bus terminal) and the output terminal (i.e. the capacitor Co, or between the live wire and the earth wire of a power gird) of the power conversion device 100. An internal structure and an operation of the controller 110 in FIG. 6 are basically the same as the internal structure of the controller 110 in FIG. 2, and detail repetitious descriptions are omitted here. It should be noted that an original two-phase circuit design is increased to a three-phase circuit design, and the controller 110 is configured to generate corresponding control signals S1-S12 to the multi-phase circuit 120B. In some embodiments, the control signals S1-S12 are pulse-width modulation (PWM) signals.

In some embodiments, the multi-phase circuit 120B includes a first phase circuit, a second phase circuit, a third phase circuit, resonant capacitors Cr1-Cr3, resonant inductors Lr1-Lr3, magnetizing inductors LM1-LM3 and transformers TS1-TS3. The first phase circuit includes a primary side circuit P1 and a rectifier side circuit R1. The second phase circuit includes a primary side circuit P2 and a rectifier side circuit R2. The third phase circuit includes a primary side circuit P3 and a rectifier side circuit R3. The primary side circuit P1, the primary side circuit P2 and the primary side circuit P3 are half bridge circuit. The rectifier side circuit R1, the rectifier side circuit R2 and the rectifier side circuit R3 are half bridge circuit.

Like the multi-phase circuit 120A in FIG. 2, the multi-phase circuit 120B basically consists of four structures, including a primary side, a resonant side, a transformer side and a rectifier side. The primary side is the aforementioned primary side circuit P1, the primary side circuit P2 and the primary side circuit P3, and is configured to convert a DC voltage (i.e. the bus terminal voltage Vbus) into a high frequency square wave for inputting to the resonant side. The resonant side is the aforementioned resonant capacitors Cr1-Cr3, the resonant inductors Lr1-Lr3 and the magnetizing inductors LM1-LM3, and is configured to eliminate harmonics of the high-frequency square wave on the primary side and output a sine wave.

The transformer side is the aforementioned transformers TS1-TS3, and is configured to output the sine wave to the rectifier side, and perform voltage boosting and bucking according to actual needs. The rectifier side is the rectifier side circuit R1, the rectifier side circuit R2 and the rectifier side circuit R3, and is configured to convert the sine wave into a stable DC voltage (i.e., the output voltage Vo). The aforementioned content is an operation and an output of different multi-phase voltages of the multi-phase circuit 120B.

In some embodiments, the primary side circuit P1 includes a switch T1 and a switch T2. The primary side circuit P2 includes a switch T3 and a switch T4. The primary side circuit P3 includes a switch T5 and a switch T6. The rectifier side circuit R1 includes a switch T7 and a switch T8. The rectifier side circuit R2 includes a switch T9 and a switch T10. The rectifier side circuit R3 includes a switch T11 and a switch T12.

In some embodiments, the switch T1 to the switch T12 can be respectively implemented as P-type Metal-Oxide-Semiconductor Field-Effect Transistor (PMOS) or N-type Metal-Oxide-Semiconductor Field-Effect Transistor (NMOS) according to actual needs.

Compared with the multi-phase circuit 120A in FIG. 2, a first difference between the multi-phase circuit 120A and the multi-phase circuit 120B is an addition of a third phase circuit. A second difference is that the multi-phase circuit 120B includes three sets of resonant tanks (i.e. the resonant capacitors Cr1-Cr3, the resonant inductors Lr1-Lr3 and the magnetizing inductors LM1-LM3), rectifier side inductors Ls1-Ls3 and capacitors Cs1-Cs3. A circuit structure of the multi-phase circuit 120B includes three groups of resonant circuits. Each resonant circuit basically consists of a pair of half-bridge circuits on the primary side and the rectifier side paired with a set of resonant tank.

Figure 7:
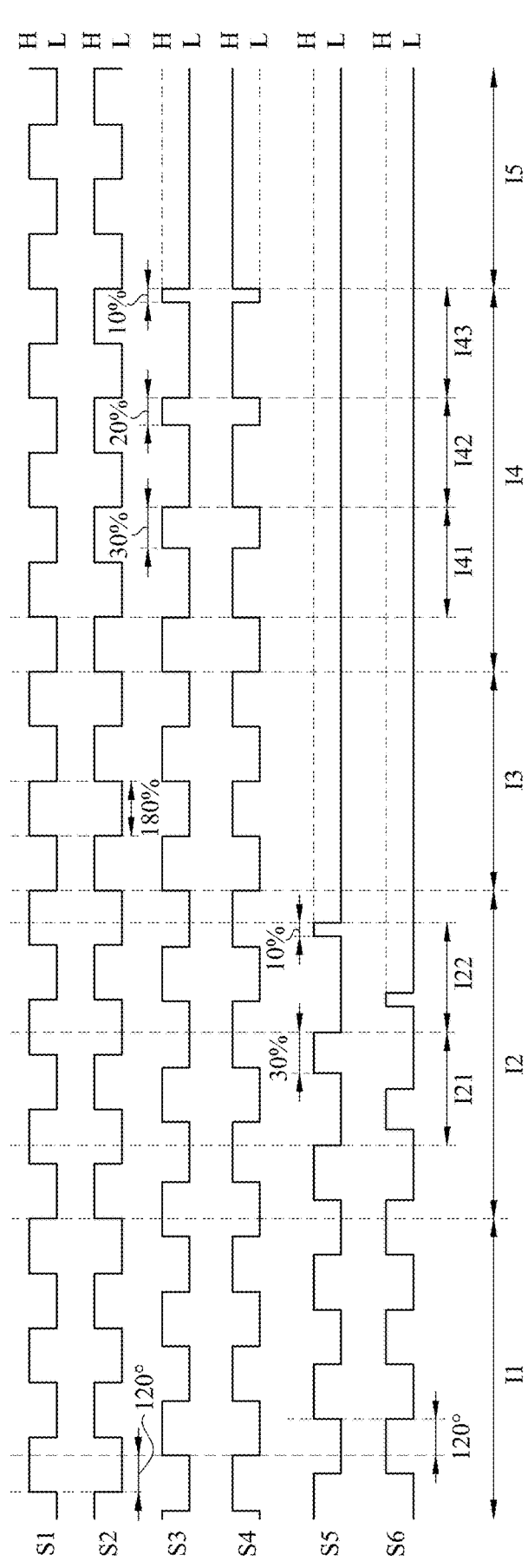
FIG. 7 depicts a timing diagram of control signals of a multi-phase circuit of a power conversion device according to some embodiments of the present disclosure.

FIG. 7 depicts a timing diagram of control signals of the multi-phase circuit 120B of the power conversion device 100 according to some embodiments of the present disclosure. In some embodiments, please refer to FIG. 6 and FIG. 7, the switch T1 and the switch T2 of the primary side circuit P1 of the first phase circuit are conducted in turns according to the control signal S1 and the control signal S2 respectively in the stage I1. At the same time, the switch T3 and the switch T4 of the primary side circuit P2 of the second phase circuit are conducted in turns according to the control signal S3 and the control signal S4 respectively. The switch T5 and the switch T6 of the primary side circuit P3 of the third phase circuit are conducted in turns according to the control signal S5 and the control signal S6 respectively. The DC voltage (i.e. the bus terminal voltage Vbus) is converted into a high-frequency square wave through the primary side circuit P1, the primary side circuit P2 and the primary side circuit P3. Then, a stable three-phase voltage is outputted to the output terminal (i.e. the capacitor Co) through the conversion of the resonant side, the transformer side and the rectifier side respectively. In some embodiments, a voltage range of the three-phase voltage is between 400V and 800V or above 800V. A phase difference between each phase of the three-phase voltage is 120°.

Figure 8:
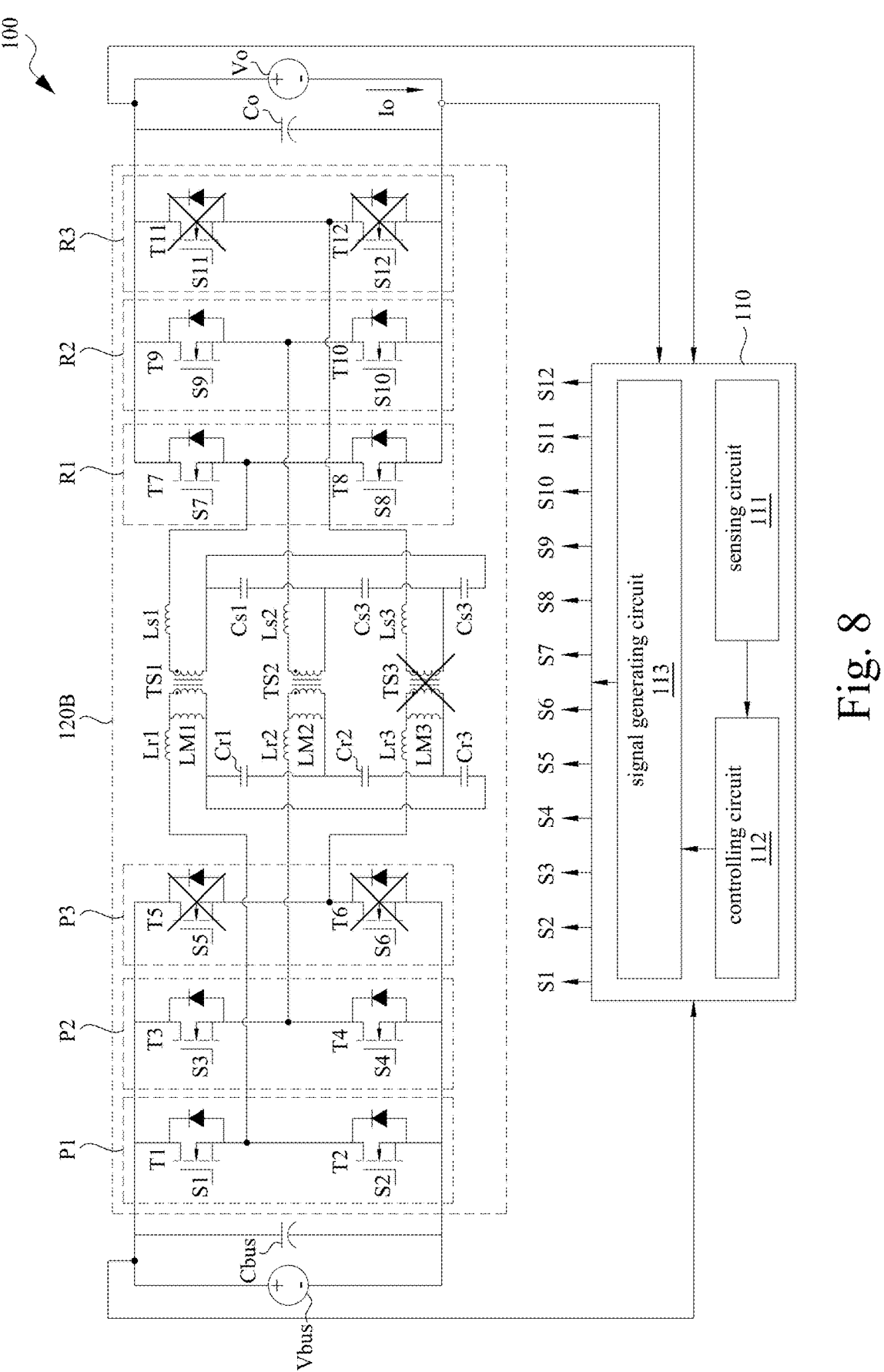
FIG. 8 depicts a schematic diagram of a circuit state of a multi-phase circuit of a power conversion device according to some embodiments of the present disclosure.

FIG. 8 depicts a schematic diagram of a circuit state of the multi-phase circuit 120B of the power conversion device 100 according to some embodiments of the present disclosure. In some embodiments, please refer to FIG. 7 and FIG. 8, when the controller 110 is configured to detect that the output voltage Vo is lower than a preset voltage (for example, 400V, the value in only configured as an example and is not limited to this embodiment) in the stage I1, the controller 110 is configured to change the duty cycle of the control signal S5 and the duty cycle of the control signal S6 in the sub-stage I21 and the sub-stage I22 of the stage I2 respectively to reduce them to 30% and 10% in sequence. Finally, in the stage I3, the duty cycle of the control signal S5 and the duty cycle of the control signal S6 are adjusted to zero by the controller 110 to turn off the primary side circuit P3 and the rectifier side circuit R3 of the third phase circuit.

At the same time, the controller 110 is configured to gradually increase the phase difference between the control signal S1 and the control signal S3 from 120° in the stage I1 to the sub-stage I21 and the sub-stage I22 of the stage I2. In the stage I3, the phase difference between the control signal S1 and the control signal S3 is increased to 180°. Similarly, the controller 110 is configured to gradually increase the phase difference between the control signal S2 and the control signal S4 from 120° in the stage I1 to the sub-stage I21 and the sub-stage I22 of the stage I2. In the stage I3, the phase difference between the control signal S1 and the control signal S3 is increased to 180°. Finally, the power conversion device 100 is configured to output a stable two-phase voltage to the output terminal (i.e. the capacitor Co) through the conversion of the primary side, the resonant side, the transformer side and the rectifier side. A phase difference between each phase of the two-phase voltage is 180°.

Figure 9:
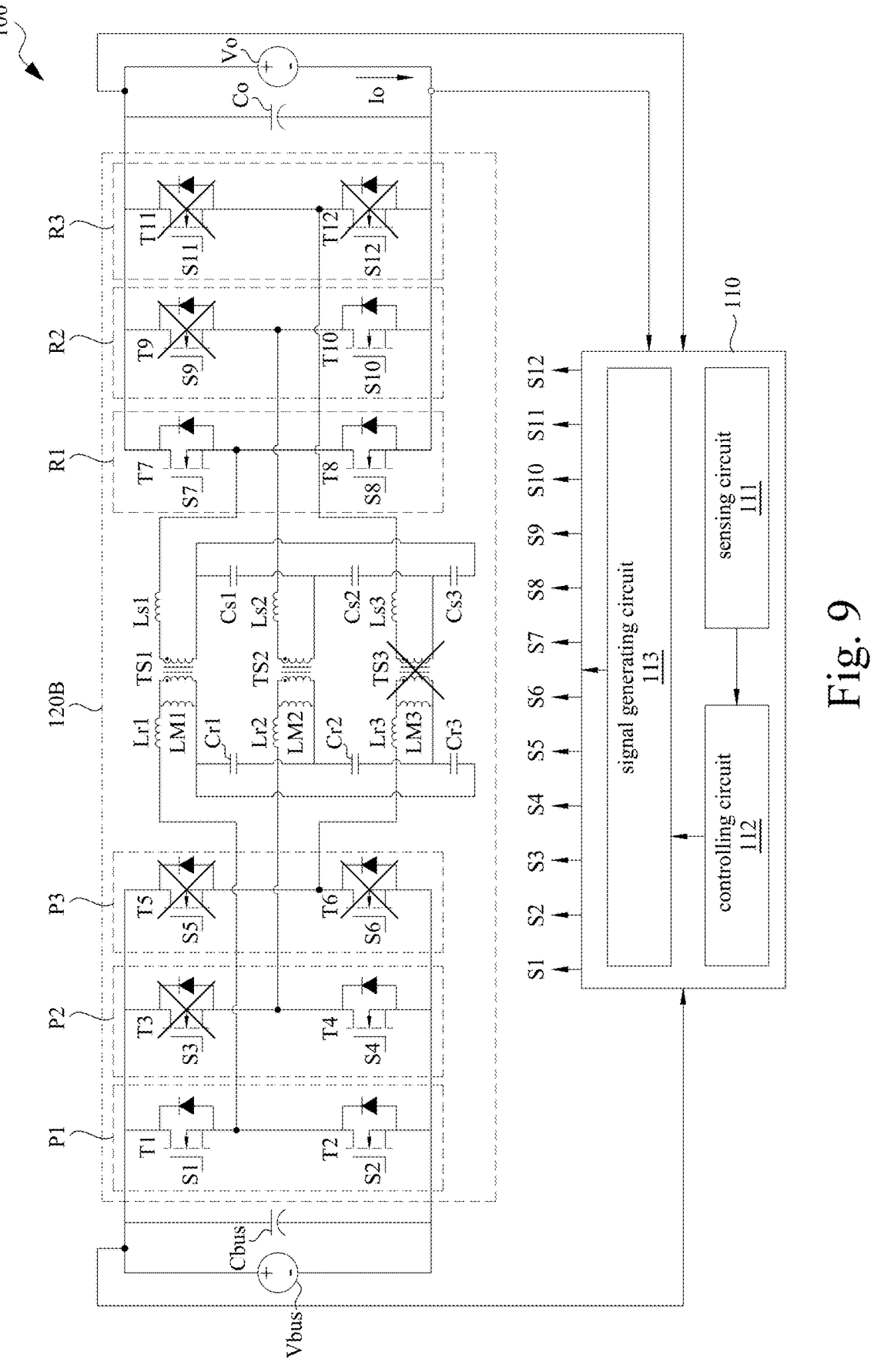
FIG. 9 depicts a schematic diagram of a circuit state of a multi-phase circuit of a power conversion device according to some embodiments of the present disclosure.

FIG. 9 depicts a schematic diagram of a circuit state of the multi-phase circuit 120B of the power conversion device 100 according to some embodiments of the present disclosure. In some embodiments, please refer to FIG. 7 and FIG. 9, when the controller 110 is configured to detect that the output voltage Vo is further lower than a preset voltage (for example, 250V, the value in only configured as an example and is not limited to this embodiment) in the stage I1, the controller 110 is configured to gradually reduce the duty cycle of the control signal S3 in the stage I3 from 50% to 30%, 20% and 10% in three sub-stages 141 to 143 of the stage I4 respectively. Finally, in the stage I5, the duty cycle of the control signal S3 is adjusted to zero by the controller 110.

At the same time, the controller 110 is configured to gradually increase the duty cycle of the control signal S4 in the stage I3 from 50% to 70%, 80% and 90% (relative to the control signal S3) in three sub-stages 141 to 143 of the stage I4 respectively. Finally, in the stage I5, the duty cycle of the control signal S4 is adjusted to 100% by the controller 110.

Finally, the power conversion device 100 is configured to output a stable single-phase voltage to the output terminal (i.e. the capacitor Co) through the conversion of the primary side, the resonant side, the transformer side and the rectifier side.

In some embodiments, if the output voltage Vo is higher than the preset voltage (for example, 250V, the value in only configured as an example and is not limited to this embodiment), the controller 110 is configured to change the duty cycle of the control signal S3 and the duty cycle of the control signal S4 (equivalent to a reverse change from the stage I5 to the stage I3) to switch from outputting a stable single-phase voltage to outputting a stable two-phase voltage through the first phase circuit and the second phase circuit.

In some embodiments, if the output voltage Vo is higher than the preset voltage (for example, 400V, the value in only configured as an example and is not limited to this embodiment), the controller 110 is configured to change the duty cycle of the control signal S5 and the duty cycle of the control signal S6, and change the phase of the control signal S3 and the phase of the control signal S4 (equivalent to a reverse change from the stage I3 to the stage I1), to switch from outputting a stable two-phase voltage to outputting a stable three-phase voltage through the first phase circuit, the second phase circuit and the third phase circuit.

Based on the aforementioned embodiments, the present disclosure provides a design that uses a multi-phase circuit control method of the present disclosure, so that a multi-phase circuit of a power conversion device can meet different voltage ranges and current ranges and can provide multi-phase voltages (such as a three-phase voltage, a two-phase voltage and a single-phase voltage) according to output voltage requirements on a live line to meet different gain requirements.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A multi-phase circuit control method, adapted for a multi-phase circuit, wherein the multi-phase circuit is coupled to an input terminal and an output terminal of a power conversion device, wherein the multi-phase circuit is configured to convert an input voltage of the input terminal into an output voltage required by the output terminal, wherein the multi-phase circuit comprises a first phase circuit and a second phase circuit, wherein each of the first phase circuit and the second phase circuit comprises a primary side circuit and a rectifier side circuit, wherein each of the primary side circuit and the rectifier side circuit comprise a first switch and a second switch, wherein the multi-phase circuit control method comprises:

generating a first control signal and a second control signal to the first phase circuit respectively by a controller;

generating a third control signal and a fourth control signal to the second phase circuit respectively by the controller;

outputting a two-phase voltage to the output terminal by the first phase circuit and the second phase circuit;

changing a duty cycle of the third control signal to turn off the first switch of the primary side circuit and the rectifier side circuit of the second phase circuit by the controller when the controller is configured to detect that the output voltage is lower than a first preset voltage;

changing a duty cycle of the fourth control signal to conduct the second switch of the primary side circuit and the rectifier side circuit of the second phase circuit; and outputting a single-phase voltage to the output terminal by the first phase circuit and the second phase circuit.

2. The multi-phase circuit control method of claim 1, wherein changing the duty cycle of the third control signal to turn off the first switch of the primary side circuit and the rectifier side circuit of the second phase circuit by the controller comprises:

gradually reducing the duty cycle of the third control signal by the controller during a switching stage;

wherein changing the duty cycle of the fourth control signal to conduct the second switch of the primary side circuit and the rectifier side circuit of the second phase circuit comprises:

gradually increasing the duty cycle of the fourth control signal by the controller during the switching stage.

3. The multi-phase circuit control method of claim 1, wherein the multi-phase circuit further comprises a third phase circuit, wherein the third phase circuit comprises a primary side circuit and a rectifier side circuit, wherein each of the primary side circuit and the rectifier side circuit comprises a first switch and a second switch, wherein the multi-phase circuit control method further comprises:

generating a fifth control signal by the controller to the first switch of the primary side circuit and the rectifier side circuit of the third phase circuit;

generating a sixth control signal by the controller to the second switch of the primary side circuit and the rectifier side circuit of the third phase circuit of the third phase circuit; and outputting a three-phase voltage to the output terminal by the first phase circuit, the second phase circuit and the third phase circuit.

4. The multi-phase circuit control method of claim 3, wherein the multi-phase circuit control method further comprises:

changing a duty cycle of the fifth control signal and a duty cycle of the sixth control signal respectively to turn off the third phase circuit by the controller when the controller is configured to detect that the output voltage is lower than a second preset voltage;

changing a phase of the third control signal and a phase of the fourth control signal by the controller to adjust a driving mode of the second phase circuit; and outputting the two-phase voltage to the output terminal by the first phase circuit and the second phase circuit.

5. The multi-phase circuit control method of claim 4, wherein changing the duty cycle of the fifth control signal and a duty cycle of the sixth control signal respectively to turn off the third phase circuit by the controller comprises:

gradually reducing the duty cycle of the fifth control signal by the controller during a switching stage; and gradually reducing the duty cycle of the sixth control signal during the switching stage.

6. The multi-phase circuit control method of claim 4, wherein changing the phase of the third control signal and the phase of the fourth control signal by the controller to adjust the driving mode of the second phase circuit comprises:

gradually increasing a phase shift between the first control signal and the third control signal by the controller; and gradually increasing a phase shift between the second control signal and the fourth control signal by the controller.

7. The multi-phase circuit control method of claim 4, wherein the multi-phase circuit control method further comprises:

changing the duty cycle of the third control signal and the duty cycle of the fourth control signal by the controller respectively when the controller is configured to detect that the output voltage is lower than the first preset voltage; and outputting the single voltage to the output terminal by the first phase circuit and the second phase circuit.

8. The multi-phase circuit control method of claim 7, wherein the first preset voltage is lower than the second preset voltage.

9. The multi-phase circuit control method of claim 7, wherein changing the duty cycle of the third control signal and the duty cycle of the fourth control signal by the controller respectively comprises:

gradually reducing the duty cycle of the third control signal by the controller during a switching stage; and gradually increasing the duty cycle of the fourth control signal by the controller during the switching stage.

10. A power conversion device, comprising:

a controller, coupled to an input terminal and an output terminal of the power conversion device, wherein the controller is configured to generate a first control signal, a second control signal, a third control signal and a fourth control signal; and a multi-phase circuit, coupled to the input terminal and the output terminal of the power conversion device, wherein the multi-phase circuit comprises:

a first phase circuit, coupled to the controller, and configured to be conducted according to the first control signal and the second control signal; and a second phase circuit, coupled to the controller, and configured to be conducted according to the third control signal and the fourth control signal, wherein the first phase circuit and the second phase circuit are jointly configured to generate a two-phase voltage;

wherein when the controller is configured to detect that an output voltage of the output terminal is lower than a first preset voltage, the controller is configured to change a duty cycle of the third control signal and a duty cycle of the fourth control signal respectively so as to control the first phase circuit and the second phase circuit to output a single-phase voltage.

11. The power conversion device of claim 10, wherein the controller is further configured to generate a fifth control signal and a sixth control signal, wherein the multi-phase circuit further comprises:

a third phase circuit, coupled to the controller, and configured to be conducted according to the fifth control signal and the sixth control signal, wherein the third phase circuit, the first phase circuit and the second phase circuit are jointly configured to generate a three-phase voltage.

12. The power conversion device of claim 11, wherein when the controller is configured to detect that the output voltage is lower than a second preset voltage, the controller is further configured to change a duty cycle of the fifth control signal and a duty cycle of the sixth control signal to turn off the third phase circuit, wherein the controller is further configured to change a phase of the third control signal and a phase of the fourth control signal so as to control the first phase circuit and the second phase circuit to output a two-phase voltage.

13. The power conversion device of claim 12, wherein the duty cycle of the fifth control signal and the duty cycle of the sixth control signal are gradually changed to zero in a switching stage.

14. The power conversion device of claim 12, wherein the controller is configured to detect that the output voltage is lower than the first preset voltage, the controller is further configured to change the duty cycle of the third control signal and the duty cycle of the fourth control signal so as to control the first phase circuit and the second phase circuit to output the single-phase voltage.

15. The power conversion device of claim 14, wherein the duty cycle of the third control signal and the duty cycle of the fourth control signal are gradually changed to be different from each other in a switching stage.

\* \* \* \* \*